United States Patent [19]
Roos

[11] 3,771,546
[45] Nov. 13, 1973

[54] CIRCULAR KNIFE CUTTER FOR FITTING USED WITH PLASTIC MAIN OR PIPES

[75] Inventor: Robert R. Roos, Decatur, Ill.

[73] Assignee: Mueller Co., Decatur, Ill.

[22] Filed: Oct. 11, 1972

[21] Appl. No.: 296,588

Related U.S. Application Data

[63] Continuation of Ser. No. 46,373, June 15, 1970, abandoned.

[52] U.S. Cl. .............................................. 137/318
[51] Int. Cl. ...................... F16e 41/04, B23b 41/08
[58] Field of Search ............................ 137/317, 318

[56] References Cited
UNITED STATES PATENTS

| | | | |
|---|---|---|---|
| 1,664,796 | 4/1928 | Spangle | 137/318 |
| 2,794,352 | 6/1957 | Mueller | 137/318 X |
| 2,839,075 | 6/1958 | Mueller | 137/318 |
| 3,240,226 | 3/1966 | Burkholder | 137/318 |
| 3,307,435 | 3/1967 | Floren | 137/318 X |

FOREIGN PATENTS OR APPLICATIONS

| 46,077 | 2/1889 | Germany | 137/318 |

Primary Examiner—Henry T. Klinksiek
Assistant Examiner—David R. Matthews
Attorney—Lloyd J. Street

[57] ABSTRACT

A tapping plug for use with a plastic tapping T secured to a plastic main, the tapping T being of the type having a through-bore with an interior thread and a lateral outlet communicating with the bore, and adapted to be connected to a service pipe. The tapping plug which includes a plastic plug body member having an exterior thread for engaging the interior thread of the through-bore so that the same can be advanced therethrough. The plug body has a thin wall cylindrical metal band cutter member, coaxially fixed to one end thereof. The cutter member has a knife edge defined by an internal bevelled surface and an external bevelled surface, thus providing controlled deformation of the same during cutting and resulting in a reduced cutting load between the plastic main and the plastic body member through the plastic tapping T.

7 Claims, 9 Drawing Figures

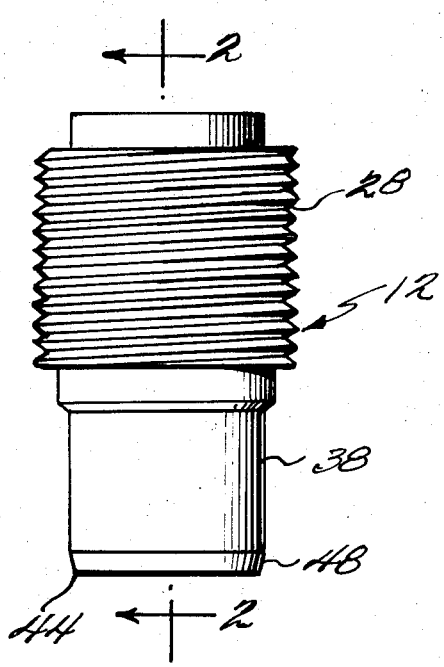
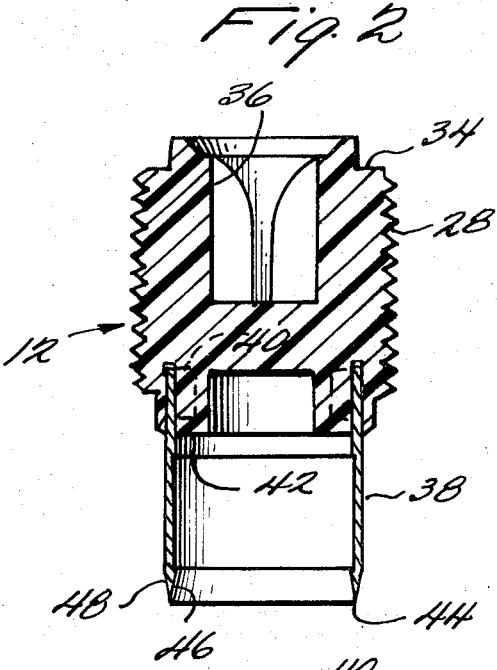
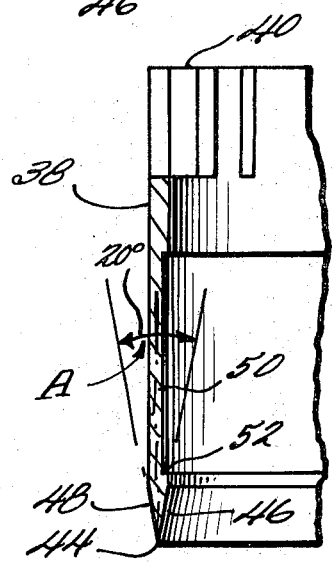
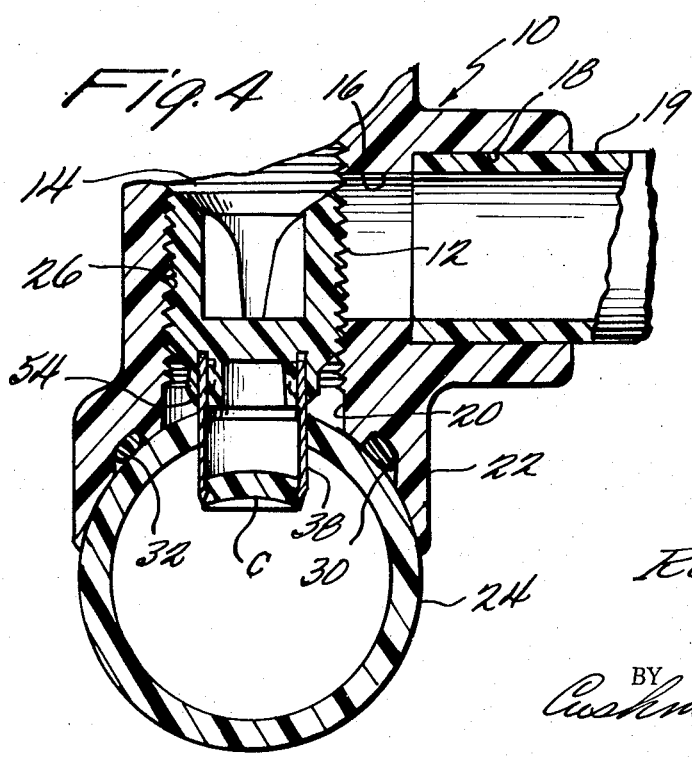

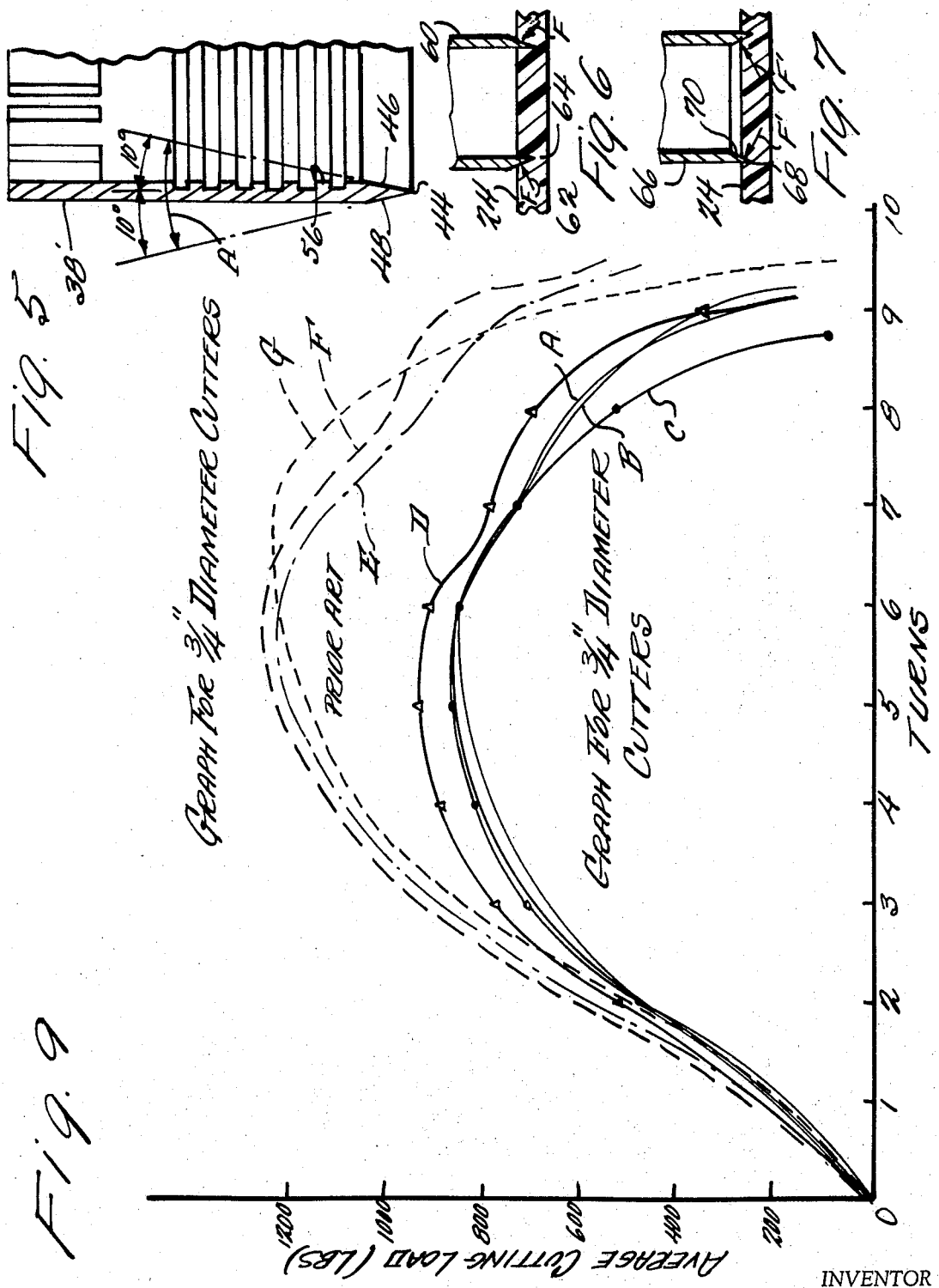

Patented Nov. 13, 1973
3,771,546
3 Sheets-Sheet 3
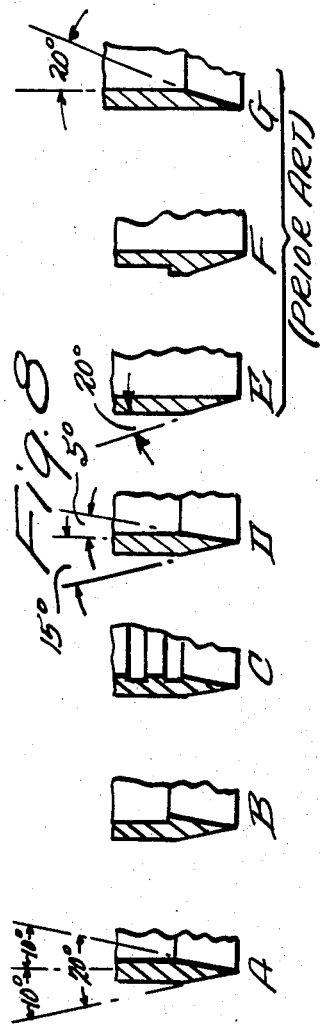
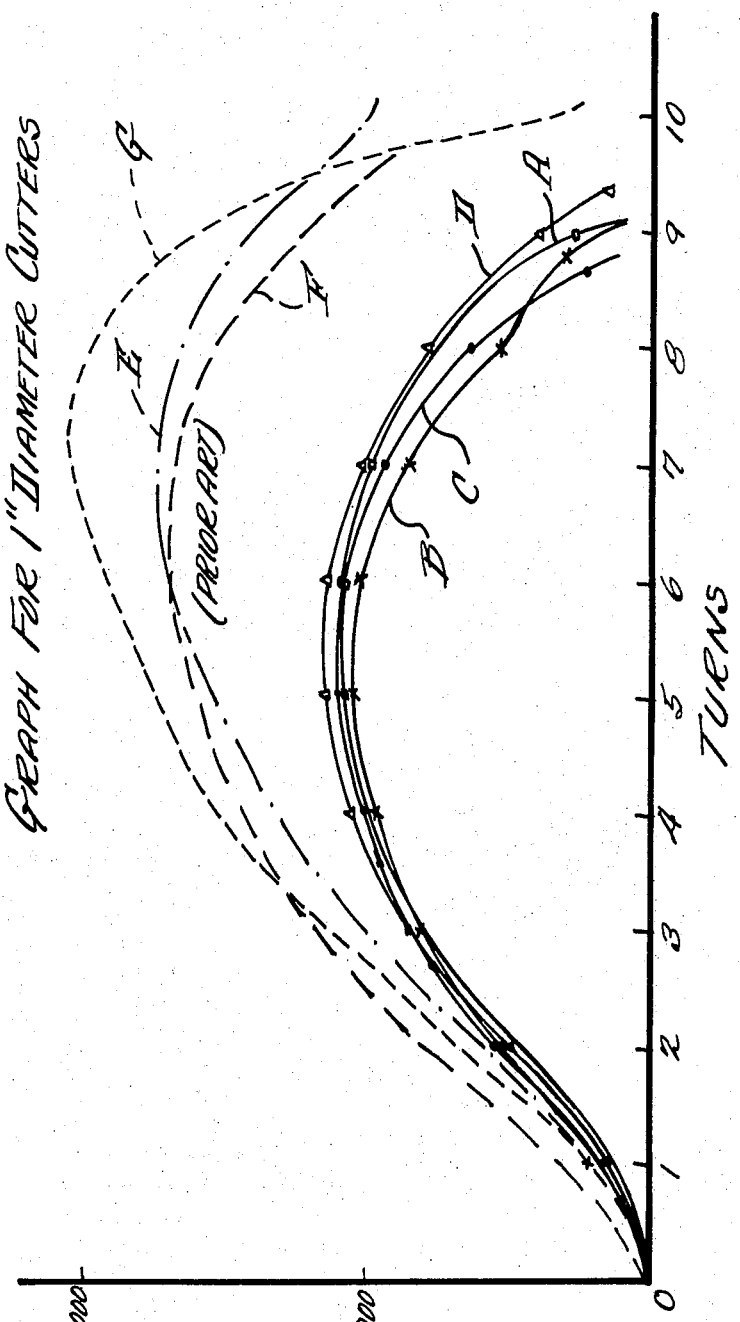
INVENTOR
ROBERT R. ROOS
BY
Cushman Darby & Cushman
ATTORNEYS

CIRCULAR KNIFE CUTTER FOR FITTING USED WITH PLASTIC MAIN OR PIPES

This is a continuation, of application Ser. No. 46,373, filed June 15, 1970, now abandoned.

The present invention relates to an improvement in a tapping plug for use in cutting a hole in a plastic main when it is desirous to set up a flow-way between the plastic main of a fluid distribution system, such as gas or water, and a secondary main or service line.

BACKGROUND OF THE INVENTION

Self-tapping fittings such as a plastic service T for tapping a plastic main have been heretofore utilized in connecting a secondary main or service line to the plastic main without the escape of fluid from the plastic main to the atmosphere. Such prior arrangements have utilized a plastic service T having a through-bore and a lateral outlet communicating with the through-bore and to which the service line is connected. The plastic service T is usually provided with a saddle for snug engagement with the side of the plastic main, the same being held on the plastic main by a solvent-weld operation or a combination of mechanical strap or clamping means and a solvent-weld operation. The tapping service T is provided with an interior thread in its through-bore and a tapping plug having an exterior thread for engagement with the interior thread of the through-bore. Rotation of the tapping plug advances the same axially through the through-bore for the purpose of cutting and removing a coupon from the plastic main. Such self-tapping plastic service Tees are disclosed in U. S. Pat. Nos. 2,794,352, issued June 4, 1957 to Mueller; 2,839,075 issued June 17, 1958 to Mueller; and 3,460,553 issued Aug. 12, 1969 to Leopold et al.

In each of the aforementioned patents, there is disclosed a tapping plug which includes a plastic plug body having a thin wall cylindrical metal band cutter member secured to one end thereof and provided with a knife edge. In each instance, the knife edge is defined by an internal bevelled surface and, consequently, special means had to be provided, such as a screw projecting from the plastic plug body for threading into the coupon being cut. Since the metal band cutter member with the internal bevelled surface defining the knife edge initially contacted the plastic pipe at two points only on its cylindrical contour, and outwardly directed force component on the bevelled surface tended to expand the cutter member along the axis of the pipe so that the hole cut was considerably out of round and more or less elliptical with a major axis parallel to the axis of the main.

Other efforts have been made to provide the cutter member with a knife edge formed by a bevelled surface wholly on the outside of the cutter member, but this arrangement was not completely satisfactory because the cutting edge so formed by the outside bevelled surface would engage the plastic pipe in two points only in the high spots of its curvature, and a force component would develop which tended to collapse the cutter member's diameter, this too making an out of round, or slightly elliptical hole having its major axis transverse of the axis of the plastic main. In both instances, the "cutting load" between the plastic main and the tapping plug was extremely high and since the coupon cut was not round, the deformed cutter member required high torques for advancing the same through the wall of the plastic main.

Typical other prior art arrangements may be found in the following patents:
U. S. Pat. No. 3,176,708, issued Apr. 6, 1965 to Shields
British Pat. No. 837,399, issued June 15, 1960 to Momberg

BRIEF SUMMARY OF THE INVENTION

The present invention provides an improved tapping plug for use with a plastic tapping T. In more detail, the tapping plug is provided with a plastic plug body having the usual exterior threads thereon for engaging the interior thread of the through-bore in the tapping T so that the same can be advanced axially therethrough. A thin wall cylindrical metal band cutter member of smaller diameter than, and coaxially fixed to, one end of the plastic plug body is provided, the cutter member having a knife edge defined by an external bevelled surface and an internal bevelled surface, the two bevelled surfaces having an included angle therebetween in the order of 20°. By providing both an internal bevelled surface and an external bevelled surface to define the circular cutting edge of the cylindrical cutter member, the force components of the individual surfaces may be utilized to provide a controlled deformation of the cutter member. A substantial reduction in "cutting load" is realized, as well as a reduction in torque necessary to advance the tapping plug in the tapping T.

The term "cutting load" as used in this specification is defined as the reactionary load in pounds of the plastic main against the plastic plug body as the tapping plug is turned down into the plastic main. This load is directed straight up and away from the top of the plastic main along the axis of the plastic service T and is transmitted to the plastic service T from the tapping plug through the external threads of the plug body and the internal threads of the T. The upward "cutting load" tends to lift the plastic service T from the plastic main, deflecting the service T saddle and/or stretching the clamping means holding the service T to the main, if such clamp means is used. One major reason for keeping the "cutting load" as low as possible is to prevent thread damage to the tapping plug and tapping service T, especially in instances where the plastic Tees are solvent-welded to the plastic mains and the solvent vapors work up into the T with a tendency to soften the threads. Another advantage of keeping the "cutting load" as low as possible is in the situation where the plastic serivce T is attached to the plastic main solely by a solvent-weld or an adhesive. The strength of a solvent-weld and some adhesives increase in time, but such time is measured in hours and therefore, if a lower "cutting load" is realized, then there is shorter "waiting" time between the mounting of the plastic service T on the plastic main and the operation of the tapping plug to make the cuts or perforations in the main.

The hole cut in the plastic main by the cutter member of the present invention, utilizing both an inside and an outside bevelled surface for defining the cutting edge, has a superior profile configuration over holes cut in plastic mains wherein the cutter member had only an inside bevelled surface to define the cutting edge or an outside bevelled surface to define the cutting edge. In this respect, the holes cut by the cutter member of the present invention were closer to being circular, and additionally, little, if any, material was upset around the exterior or the interior of the cut hole.

BRIEF DESCRIPTION OF THE DRAWINGS

FIG. 1 is a side elevational view of a tapping plug of the present invention having the improved thin wall cylindrical metal band cutter member;

FIG. 2 is a sectional view of the tapping plug of the present invention, taken on the line 2—2 of FIG. 1;

FIG. 3 is an enlarged fragmentary sectional view of just the thin wall cylindrical metal band cutter member of FIG. 2;

FIG. 4 is a vertical sectional view through a plastic servic T mounted on a plastic main, the view illustrating the tapping plug of the present invention after it has been advanced to a position cutting a coupon from the plastic main;

FIG. 5 is a fragmentary sectional view similar to FIG. 3, but illustrating a modified form of cutter member, the cutter member utilizing an interior thread for assisting in retaining the coupon within the same;

FIG. 6 is a diagrammatic sectional view of a prior art cutter member having only an external bevelled surface defining the cutting edge, the view illustrating the force components developed;

FIG. 7 is a diagrammatic sectional view of a prior art cutter member having only an internal bevelled surface defining the cutting edge, the view illustrating the force components developed;

FIG. 8 is a graph comparing the average cutting load in pounds per turns of the cutting members identified as A to G, the cutting members being 1 inch in diameter; and FIG. 9 is a graph similar to FIG. 8 showing the average cutting load in pounds per number of turns of the cutter members having the same configuration as those shown from A to G in FIG. 8, but being of ¾ inch diameter.

DETAILED DESCRIPTION OF THE INVENTION

Referring now to the drawings, wherein like character or reference numerals represent like or similar parts, and in particular to FIGS. 1-4 inclusive, there is shown a plastic service T 10 (FIG. 4) utilizing the improved tapping plug 12 of the present invention. The service T 10 is formed of any suitable plastic material known in the art, for example polyvinyl chloride, and it has a through-bore 14 and a lateral outlet 16 which opens to a socket 18 formed in the side of the service T 10, the socket 18 receiving the end of a plastic service main or pipe 19. One end of the service T 10 which has the inlet 20 for the through-bore 14 is provided with a saddle 22 for snug engagement with the side of a plastic main 24 of a gas or other fluid distribution system. The plastic main 24 may be made from any suitable plastic known in the art, such as a polyvinyl chloride. The through-bore 14 is provided with an interior thread 26 for cooperating with an exterior thread 28 provided on the tapping plug 12, as will be explained in more detail later in the specification.

The service T 10 may be secured in position on the plastic main 24 by a solvent-welding operation, such as disclosed in the common assignee's, Mueller Co., Decatur, Ill., aforementioned U.S. Pat. Nos. 2,794,352 and 2,839,075, or it may be secured in position by a combination of a solvent-welding operation and use of mechanical clamping means, such as shown in the common assignee's U.S. Pat. No. 3,460,553. If the latter means is utilized for securing the service T on the plastic main 24, a groove 30 circumscribing the inlet opening 20 is provided on the main engaging surface of the saddle 22, the groove receiving an O-ring 32, which makes a preliminary seal with the main. Additionally, it will be understood by those skilled in the art the service T 10 could be secured to the main 24 by utilizing only clamping means or by use of suitable adhesives.

Referring now to FIGS. 2 and 3, the tapping plug 12 includes a plastic plug body 34 which is provided with the exterior thread 28. The upper end of the plastic plug body 34 is provided with a non-circular socket 36 for receiving the end of an appropriate turning tool (not shown), whereas the inner end of the plug body is provided with a thin wall cylindrical metal band cutter member 38. In order to fixedly retain the cutter member 38 on the plug body 34, the cutter member is provided at its upper end with struck out wings 40, which are molded into the plastic material of the plug body. The diameter of the cutter member 38 is less than the diameter of the plastic body 34 and the cutter member is coaxial of the plug body.

The cutter member 38 is made of stainless steel and it projects below the recessed end face 42 of the plug body 34 a distance somewhat greater than the thickness of the plastic main 24 to be cut. The outer surface of the cylindrical cutter member 38 is smooth and of uniform diameter. At the lower end of the cutter member 38, a knife edge 44 is formed by an annular inner bevelled surface 46 and an annular outer bevelled surface 48. The included angle A between the inner bevelled surface 46 and the outer bevelled surface 48 is in the order of 20° and according to the present invention, it is critical that both the surface 46 and the surface 48 have an angle to an axis through the knife edge 44, which is parallel to the axis of the cutter member. A more detailed description of the cutter edge will follow later in the specification.

As clearly shown in FIG. 3, the cylindrical metal band cutter member 38 is provided with a counter-bore 50 on its interior surface which defines an undercut lip structure 52. The undercut lip structure 52 functions as a stop to retain the coupon C when the same is cut from the plastic main 24. As will be understood by those skilled in the art, the tapping plug 12 is rotated on its axis by the turning tool and it will advance in the through-bore 20 until the cutter member engages the exterior surface of the plastic main 24. Continued rotation of the tapping plug 12 further advances the same with the cutter member 38 cutting the plug from the pastic main 24. The undercut lip structure provides an area 52 for at least a portion of the periphery of coupon C to flow radially outwardly against the interior surface of the counter-bore during the cutting operation and, thus, the coupon C is prevented from falling into the plastic main 24. After the coupon C has been completely cut from the wall of the plastic main 24 as shown in FIG. 4, the turning tool is then operated to reverse rotation of the tapping plug 12 so that the same may advance upwardly through the through-bore 14 to a position past the outlet opening 16, and thus an unobstructed flow-way will be established between the plastic main 24 and the service main or pipe 19. If service is not immediately needed, the tapping plug 12 can be advanced inwardly slightly further than shown in FIG. 4 until the bevelled end 54 of the plastic plug body 34 engages the exterior of the plastic main 24 around the opening cut to provide a seal therewith.

FIG. 5 discloses a modified form of cutter member 38'. In this modification, instead of providing a counter-bore 50 to define an undercut lip structure 52, the interior of the cylindrical portion of the cutter member 38' is provided with a thread 56, which starts adjacent the upper edge of the inner bevelled surface 46. The thread 56 is preferably substantially rectangular in radial section and it will cut into the peripheral surface of the coupon C as the coupon is being cut from the main 24. This arrangement provides a very positive means for retaining the coupon C with the cutter member 38' when the cutter member is withdrawn from the hole cut in the plastic main 24.

Referring now to FIGS. 6 and 7, there are disclosed two forms of prior art cutter members, the views intending to diagrammatically show the force components developed on the cutter members when the same are initially cutting a coupon from the plastic main 24. In FIG. 6 the cutter member 60 is provided with only an external annular bevelled surface 62 to define the cutting edge 64. As this cutter member 60 is advanced through the wall of the main 24, two force components develop on the cutter member 60, the force components being directed inwardly towards each other and 180° apart as shown at F. It must be noted that the cutter member 60, as in any cutter member, initially engages the curved surface of the plastic main 24 at two points in a plane through the axis of the main. Consequently, the force components F at these two points causes the cutter member to tend to collapse on the diameter of the same lying in a plane through the axis of the plastic main 24. The hole cut by the cutter member 60 will be out-of-round, and somewhat elliptical with a major axis extending transverse to the axis of the plastic main 24. In FIG. 7 the prior art cutter member 66 is provided with a cutter edge 68 defined only by an annular inner bevelled surface 70. In this arrangement the two force components developed during the initial cutting are outwardly of each other 180° apart and in a plane through the axis of the plastic main 24. The force components identified at F' tend to expand the cutter member's diameter on an axis parallel the axis of the plastic main 24. The cutter member 66 also produces an out-of-round hole and coupon, the out-of-round hole being somewhat elliptical and having its major axis parallel to the axis of the plastic main 24. When either of the cutter members 60 or 66 is used, the average cutting load as defined heretofore is high, as well as the torque necessary to advance the tapping plug during the cutting operation.

Referring now to FIG. 8, there is disclosed a graph illustrating the cutting load versus the number of turns for various cutter designs, according to the present invention and according to the prior art. Each of the cutter members utilized in this test was made of stainless steel and had a one inch diameter. Additionally, each cutter member was used in the same type of service T to cut holes in a 6 inch diameter polyvinyl chloride plastic main, the cutter members all being molded into identical plastic plug bodies and the service T's all being secured to the plastic mains in an identical manner. As shown at the top of Graph 1, cutter members A, B, C and D all incorporated the present invention of having an outside annular bevelled surface and an inside annular bevelled surface defining the cutting edge. The included angle between the outside bevelled surface and the inside bevelled surface was in the order of 20° for each of the cutter members A to D, with the cutter members A to C having their respective inside and outside bevelled surfaces at an angle in the order of 10° with respect to an axis extending through the knife edge and parallel to an axis of the cutter member. The cutter member D differed slightly with respect to the angles of the inside and outside bevelled surfaces. In this particular arrangement, the inside bevelled surface had an angle in the order of 5° with respect to an axis through the knife edge, whereas the outside bevelled surface had an angle in the order of 15° with respect to the axis through the knife edge. The prior art designs of cutter members are E, F and G with the cutter members E and F having only a bevelled exterior surface of 20° to define the cutting edge, whereas the cutter member G had only a bevelled interior surface of 20° to define the cutting edge. The arrangement of the cutter member F was slightly different from that of E, in that it was provided with an external shoulder immediately above the external bevelled surface. This cutter member F had only an external bevelled surface such as in the prior art, but was provided with the external shoulder merely to see if it would reduce cutting load and torque.

Upon examining and comparing the curves of the Graph of FIG. 8, it will be noted that for the first turn of each of the seven cutter designs, there was not too much difference in the cutting load of the plastic main against the plastic plug body. This results from the fact that the cutter members are just beginning the cut into the surface of the plastic main and, as explained previously, the cutter members are acting only at two points, rather than around the complete annular cutter edge. As the turns increase, the graphs show a marked difference between the cutting loads for the three prior art cutters, as compared to the cutting loads of the four cutters of the present invention. The cutter members of the present invention utilizing the internal-external bevelled surface combination to define their cutting edges had average maximum cutting loads which ranged from 43 to 48 percent less than the average maximum cutting loads of the prior art cutter G which had only the internal bevelled surface to define the cutting edge. The cutter members of the present invention, i.e., A to D, had an average maximum cutting load which ranged from 33 to 39 percent less than the average maximum cutting loads of the prior art cutter members E and F, which had only the external bevelled surface to define the knife edge. The significance of this graph is that it emphasizes the importance of providing the cutter member with internal and external bevelled surfaces to define the cutting edge as the deformation of the cutter members is controlled, and is considerably less than that of each of the three prior art designs.

FIG. 9 is a graph similar to the graph of FIG. 8, except each of the various cutter members A to G had only a ¾ inch diameter, although they had cutting edge configurations. Here again, the results of comparison of the various cutter members of the present invention with that of the prior art is strikingly similar to that disclosed in FIG. 8. In the ¾ inch size cutters, the average maximum loads of the cutters A to D of the present invention ranged from 24 to 31 percent less than the average maximum cutting load of the prior art cutter G with the internal bevelled surface and 24 to 30 percent less than the average maximum cutting load of the prior art cutters E and F, which had only an external bevelled surface defining the cutting edge.

From the above description, it will now be evident that the improved cylindrical band cutter member having an annular cutting edge defined by an external bevelled surface and an internal bevelled surface produces minimum cutting loads on the T during the cutting operation, as compared to cylindrical band type cutter members of the prior art having only an extenral or an internal bevelled surface to define the cutting edge. Additionally, since the cutting load of the present invention is decreased, and the torque is decreased, the chatter during cutting is reduced to a minimum, and the coupon may be retained without the necessity of a retaining screw. Eliminating the retaining screw also eliminates coupon fracture and eliminates any significant chips or shavings from falling into the plastic main. The hole formed in the plastic main is clean without any objectionable raised beads on the external or internal surface of the main.

The terminology used in this specification is for the purpose of description, and not limitation, the scope of the invention being defined in the claims.

What is claimed is:

1. A tapping plug for use with a plastic tapping T secured to a plastic main, the tapping T having a through bore with an interior thread and a lateral outlet communicating with the bore and adapted to be connected to a service pipe, the improvement comprising: a plastic plug body having an exterior thread for engaging the interior thread of the through-bore so that the same can be advanced therethrough; and a thin wall cylindrical metal band cutter member of smaller diameter than and coaxially fixed to, one end of said plastic plug body, said metal band cutter member having a knife edge defined by an external bevelled surface and an internal bevelled surface, said external bevelled surface and said internal bevelled surface having an included angle therebetween in the order of 20°.

2. A tapping plug as claimed in claim 1 in which said external bevelled surface of said cutter member has an angle with respect to an axis extending through said knife edge and parallel to an axis of the cutter member in the order of 10° and wherein said internal bevelled surface of said cutter member has an angle with respect to said axis through said knife edge also in the order of 10°.

3. A tapping plug as claimed in claim 1, in which said external bevelled surface and said internal bevelled surface of said cutter member each has an angle with respect to an axis extending through said knife edge and parallel to an axis of the cutter member of at least 5°.

4. A tapping plug as claimed in claim 3, in which one of said external bevelled surface and said internal bevelled surface of said cutter member has an angle to said axis extending through said knife edge in the order of 15° and the other of said external bevelled surface and internal bevelled surface has an angle in the order of 5°.

5. A tapping plug as claimed in claim 1, in which said cylindrical metal band cutter member is provided with a thread on its interior surface extending from adjacent the internal bevelled surface, said last mentioned thread receiving and retaining a coupon cut from the plastic main.

6. A tapping plug as claimed in claim 5, in which the thread on the interior surface of said cutter member is substantially rectangular in radial section.

7. A tapping plug as claimed in claim 1, in which said cylindrical metal band cutter member is provided with a counter bore on its interior surface which defines an inner undercut lip structure adjacent the inner bevelled edge, said lip structure receiving and retaining a coupon cut from the plastic main.

* * * * *

UNITED STATES PATENT OFFICE
CERTIFICATE OF CORRECTION

Patent No. 3,771,546  Dated November 13, 1973

Inventor(s)  Robert R. Roos

It is certified that error appears in the above-identified patent and that said Letters Patent are hereby corrected as shown below:

In the above-identified patent, please amend the same as follows:

FRONT PAGE FORMAT:

[54] should read --CIRCULAR KNIFE CUTTER FOR FITTINGS USED WITH PLASTIC MAINS OR PIPES --

IN THE SPECIFICATION:

Column 4, line 49, delete "plug" and insert --coupon C--.

IN THE CLAIMS:

Claim 1, column 7, delete lines 25 through 37 inclusive and column 8, delete lines 1 and 2, and insert therefor the following:

--1. A tapping plug for use with a plastic tapping T secured to a plastic main, the tapping T having a through bore with an interior thread and a lateral outlet

UNITED STATES PATENT OFFICE
CERTIFICATE OF CORRECTION

Patent No. 3,771,546　　　　　　　　　Dated November 13, 1973

Inventor(s) Robert R. Roos

It is certified that error appears in the above-identified patent and that said Letters Patent are hereby corrected as shown below:

PAGE 2
(Continuation of Page 1)

communicating with the bore and adapted to be connected to a service pipe, the improvement comprising: a plastic plug body having an exterior thread for engaging the interior thread of the through-bore so that the same can be advanced therethrough; and a thin wall cylindrical metal band cutter member of smaller diameter than and coaxially fixed to, one end of said plastic plug body, said metal band cutter member having an annular knife edge defined by an external bevelled surface and an internal bevelled surface, said external bevelled surface and said internal bevelled surface having an included angle therebetween in the order of 20° and at least one of said external bevelled surface and said internal bevelled surface having an angle of at least 5° with respect to an axis extending through said knife edge and parallel to an axis of the cutter member. --

UNITED STATES PATENT OFFICE
CERTIFICATE OF CORRECTION

Patent No. 3,771,546              Dated November 13, 1973

Inventor(s)  Robert R. Roos

It is certified that error appears in the above-identified patent and that said Letters Patent are hereby corrected as shown below:

PAGE 3
(Continuation from Page 2)

Claim 2, column 8, line 4, delete "has" and insert --is--; column 8, line 8, delete "has" and insert --is--.

Cancel claim 3.

Claim 4, column 8, line 16, delete "3" and insert --1--; column 8 line 18, delete "has" and insert --is--; column 8, line 21, delete "has" and insert --is--.

After claim 7, column 8, line 36, add the following claims:

--7. A tapping plug for use with a fitting secured to a plastic main, the fitting having a through-bore with one end adapted to be connected to the plastic main, the improvement comprising: a plug body for rotative

UNITED STATES PATENT OFFICE
CERTIFICATE OF CORRECTION

Patent No. 3,771,546  Dated November 13, 1973

Inventor(s) Robert R. Roos

It is certified that error appears in the above-identified patent and that said Letters Patent are hereby corrected as shown below:

PAGE 4

(Continuation of Page 3)

advancement in the through-bore toward the plastic main; and a thin wall cylindrical band cutter member co-axial with and extending from one end of said plug body for cutting engagement with the curved wall of the plastic main, said band cutter member being of a harder material than the plastic main and having an annular knife edge defined by an external bevelled surface and an internal bevelled surface, said external bevelled surface and said internal bevelled surface having an included angle therebetween in the order of 20° and at least one of said external bevelled surface and said internal bevelled surface having an angle of at least 5° with respect to an axis extending through said knife edge and parallel to an axis of the cutter member.

8. A tapping plug as claimed in claim 7 in which at

UNITED STATES PATENT OFFICE
CERTIFICATE OF CORRECTION

Patent No. 3,771,546      Dated November 13, 1973

Inventor(s) Robert R. Roos

It is certified that error appears in the above-identified patent and that said Letters Patent are hereby corrected as shown below:

PAGE 5
(Continuation of Page 4)

least said band cutter member is metal.

9. A tapping plug as claimed in claim 8 in which said plug body is plastic.

10. A tapping plug as claimed in claim 7 in which said cylindrical cutter member has a smaller diameter than said plug body and in which said plug body has an exterior thread cooperating with an interior thread on the through-bore for rotative advancement in the through-bore.

11. A tapping plug as claimed in claim 7 in which said annular knife edge is substantially uninterrupted. --

Signed and sealed this 23rd day of July 1974.

(SEAL)
Attest:

McCOY M. GIBSON, JR.      C. MARSHALL DANN
Attesting Officer      Commissioner of Patents